United States Patent
Suh et al.

(10) Patent No.: US 8,446,874 B2
(45) Date of Patent: May 21, 2013

(54) APPARATUS AND METHOD FOR FILTERING PACKET IN A NETWORK SYSTEM USING MOBILE IP

(75) Inventors: Kyung-Joo Suh, Seoul (KR); Jin-Kyu Han, Seoul (KR); Yu-Chul Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1069 days.

(21) Appl. No.: 11/842,749

(22) Filed: Aug. 21, 2007

(65) Prior Publication Data

US 2008/0043739 A1 Feb. 21, 2008

(30) Foreign Application Priority Data

Aug. 21, 2006 (KR) .................. 10-2006-0079039

(51) Int. Cl.
*H04W 4/00* (2009.01)
*H04L 12/28* (2006.01)

(52) U.S. Cl.
USPC ........... 370/331; 370/338; 370/389; 370/392; 370/395.3

(58) Field of Classification Search
None
See application file for complete search history.

(56) References Cited

U.S. PATENT DOCUMENTS

| | | | |
|---|---|---|---|
| 6,510,465 B1* | 1/2003 | Bilansky et al. | 709/227 |
| 6,988,146 B1* | 1/2006 | Magret et al. | 709/238 |
| 2002/0080752 A1* | 6/2002 | Johansson et al. | 370/338 |
| 2004/0100951 A1* | 5/2004 | O'neill | 370/389 |
| 2005/0111454 A1* | 5/2005 | Narjala et al. | 370/392 |
| 2005/0165917 A1 | 7/2005 | Le et al. | |
| 2006/0104284 A1* | 5/2006 | Chen | 370/395.3 |
| 2006/0187881 A1* | 8/2006 | Kwak et al. | 370/331 |
| 2007/0025309 A1* | 2/2007 | Yano et al. | 370/338 |
| 2007/0177550 A1* | 8/2007 | Kwon et al. | 370/331 |

OTHER PUBLICATIONS

D. Johnson, Mobility Support in IPV6, Jun. 2004, RFC 3775 All pages.*

* cited by examiner

*Primary Examiner* — Brandon Renner
(74) *Attorney, Agent, or Firm* — The Farrell Law Firm, P.C.

(57) ABSTRACT

A network system using Mobile Internet Protocol (IP). The network system includes a correspondent node for transmitting a packet in which information passing a packet filter rule is included, and a packet filtering apparatus for determining whether an address included in information of the packet received from the correspondent node is identical to a destination address stored in the packet filter rule, and determining whether to pass the packet according to the determination result.

4 Claims, 9 Drawing Sheets

APPARATUS AND METHOD FOR FILTERING PACKET IN A NETWORK SYSTEM USING MOBILE IP

PRIORITY

This application claims priority under 35 U.S.C. §119(a) to a Korean Patent Application filed in the Korean Intellectual Property Office on Aug. 21, 2006 and assigned Serial No. 2006-79039, the contents of which are incorporated herein by reference.

BACKGROUND OF THE INVENTION

1. Field of the Invention

The present invention relates generally to a network system using Mobile Internet Protocol (IP), and in particular, to an apparatus and method for filtering packets in a network system using Mobile IP.

2. Description of the Related Art

Due to the progress of the Internet technology, there has been a rapid increase in the development of IP communication networks. In these IP communication networks, users and a particular server operate with their fixed addresses, or IP addresses, and routing is achieved based on the addresses.

Similarly, in the mobile communication system, several schemes have been proposed to provide more data to mobile terminals. The so-called Mobile IP concept of allocating IP addresses to mobile terminals has now been introduced as one of the proposed schemes. In Internet Engineering Task Force (IETF) concerned with Mobile IP, many discussions are being held and have now reached a stage of Mobile IPv6 (MIPv6). Mobile IP is classified into Mobile IP version 4 (MIPv4) and Mobile IP version 6 (MIPv6) technologies according to the version of the IP.

The IP communication network, though it started based on MIPv4, is developing into an MIPv6-based network. The MIPv6 network is an advanced network, designed to handle the limitation of available IP resources, an increase in the number of users, and provisioning of various services. The most noticeable characteristic of MIPv6 is that a length of IP address is extended from 32 bits to 128 bits, in preparation for a possible depletion of network addresses due to the rapid growth of the Internet industry.

MIPv6, as its header region is extended, is designed to designate a mechanism for source authentication of packets, and guarantee of data integrity and security.

In data transmission, this Mobile IP communication network can provide data without a change in the existing IP and/or disconnection of the access. However, since the standard for Mobile IP technology has been completed and applied to commercial products, the use of the conventional packet filter rule cannot guarantee smooth data communication.

Figure 1:
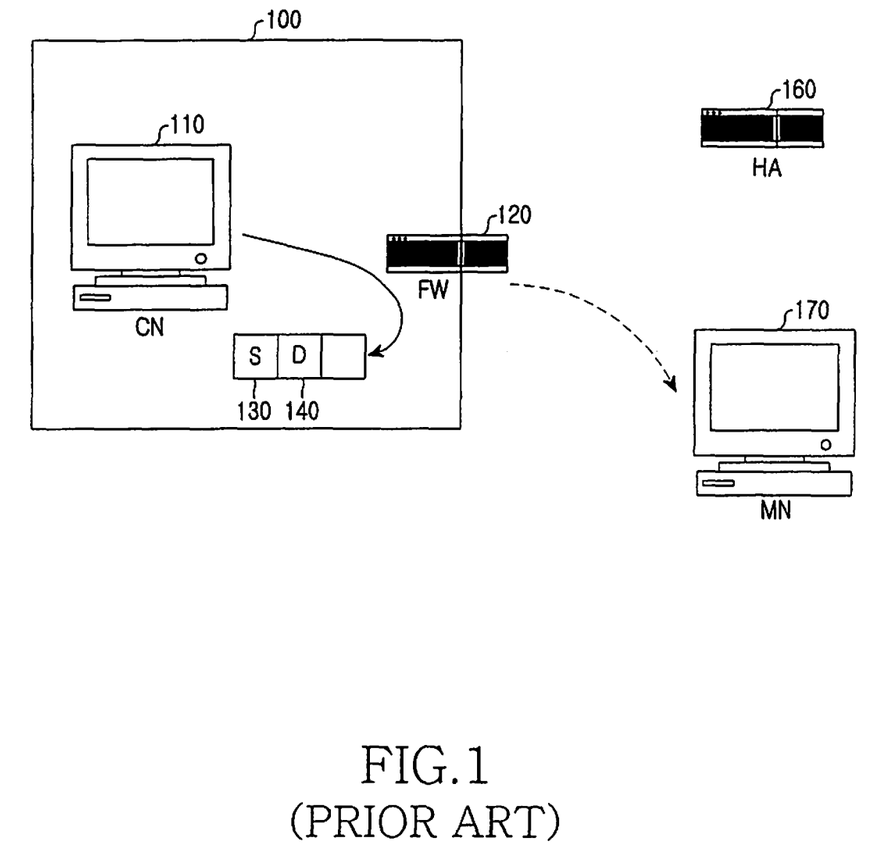
FIG. 1 is a diagram illustrating a configuration of a general network system using Mobile IP, in which a correspondent node transmits data to a mobile node.

FIG. 1 illustrates a configuration of a general network system using Mobile IP, in which a Correspondent Node (CN) transmits data to a Mobile Node (MN).

A mobile node 170 is a device such as a portable computer. A correspondent node 110 indicates a counterpart node that performs data communication with the mobile node 170.

A packet filtering apparatus 120, or FireWall (FW), prevents a comprise of the security of networks on the Internet and isolates the networks. That is, the packet filtering apparatus 120 prevents unauthorized traffic influx from the exterior and permits only the authorized and authenticated traffic in order to protect an internal network from unreliable external networks. The packet filtering apparatus 120, in which a packet filter rule is stored, can be an access router.

In MIPv6, even though the mobile node 170 having a home address (also known as a Home of Address (HoA)) assigned in a home link region leaves the home link region and moves to a remote link region, the mobile node 170 can communicate with the desired correspondent node 110 using a Care-of Address (CoA) assigned in the remote link region.

There are two possible methods in which a mobile node performs data communication with a correspondent node in a Mobile IP communication network.

A first method is a tunneling method in which the mobile node passes through a Home Agent (HA) between the mobile node and the correspondent node.

In FIG. 1, the correspondent node 110 is protected by a network to which the packet filter rule of the packet filtering apparatus 120 is applied. For communication with the correspondent node 110, the mobile node 170 initially performs communication via an HA 160, and in this communication process, the packet filter rule is stored in the packet filtering apparatus 120. When the correspondent node 110 communicates with the mobile node 170, the packet filtering apparatus 120 sets an address of a correspondent node as a source IP address and sets a home address of a mobile node as a destination IP address by means of an uplink packet filter. The term 'uplink' herein indicates a communication route from the correspondent node to the mobile node. The term 'downlink' as used herein indicates a communication route from the mobile node to the correspondent node.

A second method is a direct communication method in which for the optimization of a route, the mobile node 170 and the correspondent node 110 directly communicate with each other without passing through the HA 160.

In order for the mobile node 170 and the correspondent node 110 to directly communicate with each other without passing through the HA 160, the mobile node 170 attempts to authenticate the correspondent node 110 through a return routability process. After the authentication attempt process is successfully completed, a registration process is performed through a binding update. Even for the mobile node 170 that has completed both the authentication and registration processes, in the current standard, the uplink data that the correspondent node 110 in the protected network transmits to the mobile node 170 that has undergone authentication/registration, because its destination address is a CoA of the mobile node, is discarded (or dropped) by the packet filter rule before being transmitted to the mobile node 170. That is, in the case where the correspondent node 110 is located in a network 100 protected by the packet filter rule, because a destination address of the packet is set as a CoA by the uplink packet filter, the route-optimized data transmission from the correspondent node 110 to the mobile node 170 is impossible. In this case, if there is a change in the packet filter rule, the corresponding network can be exposed to a hacker or an attacker because of its low security level.

Figure 2:
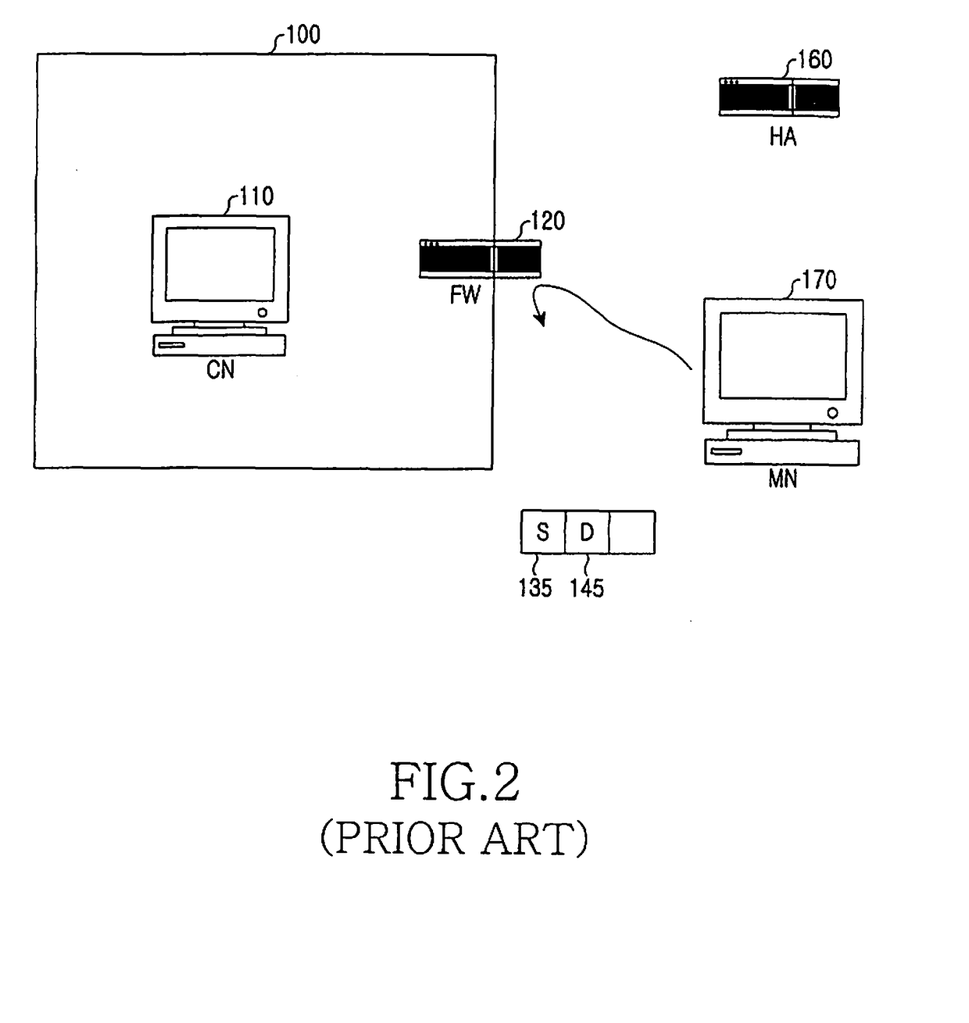
FIG. 2 is a diagram illustrating a configuration of a general network system using Mobile IP, in which a mobile node transmits data to a correspondent node.

FIG. 2 illustrates a configuration of a general network system using Mobile IP, in which a mobile node transmits data to a correspondent node.

In the Mobile IP communication network, for communication with a correspondent node 110, a mobile node 170 initially performs communication via an HA 160, and in this communication process, the packet filter rule is stored in a packet filtering apparatus 120. When the mobile node 170 communicates with the correspondent node 110, the packet filtering apparatus 120 sets a home address of the mobile node 170 as a source IP address and sets an address of the correspondent node 110 as a destination IP address by means of a packet filter.

However, to further simplify the route, the mobile node 170 and the correspondent node 110 directly communicate with each other without passing through the HA 160. When the mobile node 170 transmits data to the correspondent node 110 in the protected network 100, the corresponding data, because its source address 135 is a CoA of the mobile node 170, is discarded by the packet filter rule.

SUMMARY OF THE INVENTION

An aspect of the present invention is to address at least the problems and/or disadvantages and to provide at least the advantages described below. Accordingly, an aspect of the present invention is to provide a packet filtering apparatus and method for performing uplink communication from a correspondent node to a mobile node without passing through an HA, if the mobile node is an appropriate mobile node that has completed both an authentication process (return routability) and a registration process (binding update) for the correspondent node in a network system using Mobile IP.

Another aspect of the present invention is to provide a packet filtering apparatus and method for recognizing a characteristic of an uplink data packet transmitted from a correspondent node to a mobile node in a network system using Mobile IP.

Another aspect of the present invention is to provide a packet filtering apparatus and method for determining if an authentication process and a registration process from a mobile node to a correspondent node has been completed, adding a new rule to a packet filter rule according to the determination result, and allowing the packet filter rule to recognize a MIPv6 data transmission process in an uplink data transmission so that data can be transmitted from the correspondent node to the mobile node without being dropped during its transmission, in a network system using Mobile IP.

Another aspect of the present invention is to provide a packet filtering apparatus and method for enabling downlink communication from a mobile node to a correspondent node without passing through an HA in a network system using Mobile IP.

Another aspect of the present invention is to provide a packet filtering apparatus and method for allowing a packet filter rule to recognize a characteristic of a downlink data packet transmitted from a mobile node to a correspondent node in a network system using Mobile IP.

Another aspect of the present invention is to provide a packet filtering apparatus and method for reading an address of a packet transmitted from a correspondent node to a mobile node and an address of a packet transmitted from the mobile node to the correspondent node, both packets being transmitted without passing through an HA, in a network system using Mobile IP.

According to one aspect of the present invention, there is provided a network system using Mobile Internet Protocol (IP). The network system includes a correspondent node for transmitting a packet that includes information passing a packet filter rule; and a packet filtering apparatus for determining if an address included in information of the packet received from the correspondent node is identical to a destination address stored in the packet filter rule, and determining whether to pass the packet according to the determination result.

According to another aspect of the present invention, there is provided a packet filtering method in a network system using Mobile Internet Protocol (IP). The packet filtering method includes receiving a packet that includes information passing a packet filter rule; and determining if an address included in information of the packet received from a correspondent node is identical to a destination address stored in the packet filter rule, and determining whether to pass the packet according to the determination result.

According to further another aspect of the present invention, there is provided a packet filtering apparatus in a network system using Mobile Internet Protocol (IP). The packet filtering apparatus includes a next header reader for reading a next header of a received packet to determine if the next header is a routing header; a routing type reader for reading the routing header to determine if the routing header is a predetermined routing header type if the next header is the routing header; a home address reader for reading an address included in the routing header to determine if the address is a home address of a mobile node if the routing header is the predetermined routing header type; and a packet filter rule applier for determining if an address included in the routing header is identical to a destination address stored in the packet filter rule and determining whether to pass the packet according to the determination result, if the address included in the routing header is the home address of the mobile node.

According to yet another aspect of the present invention, there is provided a packet filtering method. The packet filtering method includes reading a next header of a received packet to determine if the next header is a routing header; reading the routing header to determine whether it is a predetermined routing header type if the next header is the routing header; reading an address included in the routing header to determine if the routing header is a home address of a mobile node if the routing header is the predetermined routing header type; and determining if an address included in the routing header is identical to a destination address stored in the packet filter rule and determining whether to pass the packet according to the determination result, if the address included in the routing header is the home address of the mobile node.

According to still another aspect of the present invention, there is provided a network system using Mobile Internet Protocol (IP). The network system includes a mobile node for transmitting a packet that includes information passing a packet filter rule; and a packet filtering apparatus for reading an address included in information of the packet received from the mobile node to determine if the address is identical to a source address stored in the packet filter rule, and determining whether to pass the packet according to the determination result.

According to still another aspect of the present invention, there is provided a packet filtering method in a network system using Mobile Internet Protocol (IP). The packet filtering method includes transmitting, by a mobile node, a packet that includes information passing a packet filter rule; and determining, by a packet filtering apparatus, if an address included in information of the packet received from the mobile node is identical to a source address stored in the packet filter rule, and determining whether to pass the packet according to the determination result.

According to still another aspect of the present invention, there is provided a packet filtering method for a packet transmitted from a mobile node to a correspondent node. The packet filtering method includes reading a next header of a received packet to determine if the next is a destination option header; reading an option type if the next header is the destination option header; reading the option type to determine if the option type is a home address option; and determining if a home address in a home address option header is identical to a source address stored in a packet filter rule and determining whether to pass the packet according to the determination result, if the option type is the home address option.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

The present invention provides a packet filtering apparatus and method for reading an address of a packet transmitted from a correspondent node to a mobile node and an address of a packet transmitted from the mobile node to the correspondent node, both packets being transmitted without passing through an HA.

In addition, the present invention provides a packet filtering apparatus and method for preventing uplink data transmitted from a correspondent node to a mobile node and downlink data transmitted from the mobile node to the correspondent node from being discarded in a packet filtering apparatus when the correspondent node is protected by a network to which a packet filter rule of the packet filtering apparatus is applied.

Further, the present invention provides a packet filtering apparatus and method for applying a packet filter rule capable of recognizing a packet transmitted from a correspondent node located in a protected network to a mobile node and a packet transmitted from the mobile node to the correspondent node, thereby enabling efficient uplink data transmission and downlink data transmission.

For convenience, the uplink data transmitted from the correspondent node to the mobile node will be described in a first embodiment, and the downlink data transmitted from the mobile node to the correspondent node will be described in a second embodiment.

Although the correspondent node described herein means a node capable of communicating with mobile nodes, it is not intended to limit the correspondent node to a particular node, and the correspondent node can be all nodes using Mobile IP. For convenience, the following description will be made with reference to a MIPv6 network system.

Figure 3:
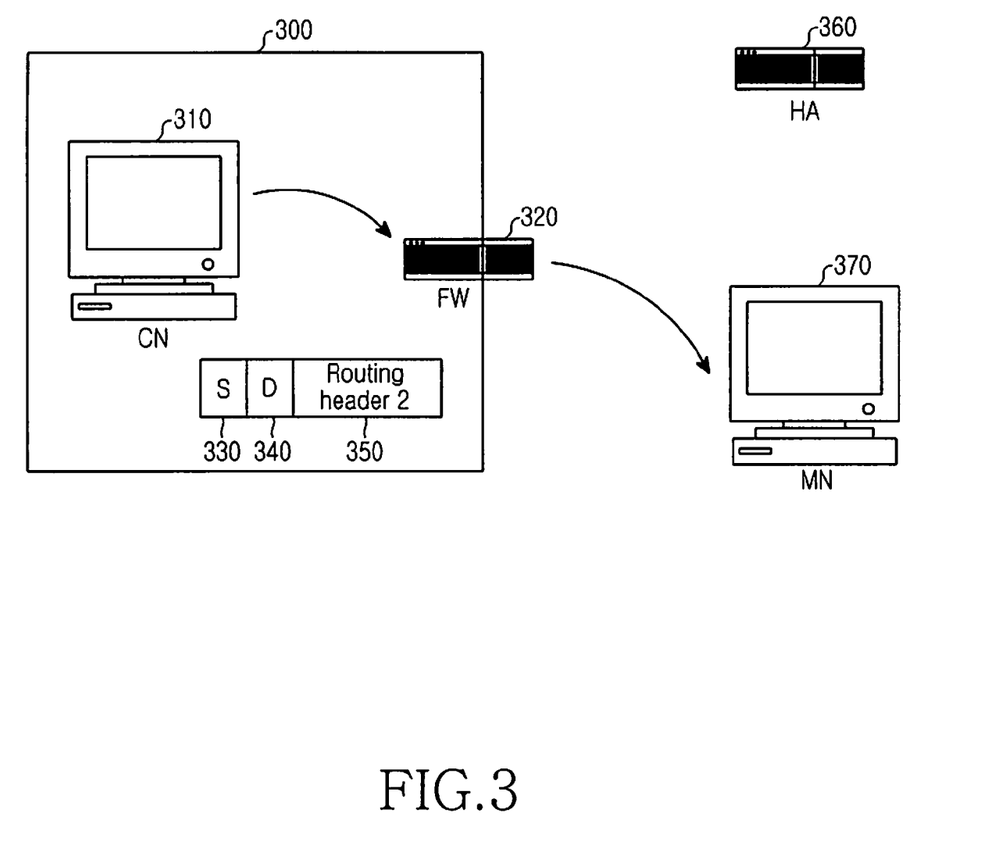
FIG. 3 is a diagram illustrating a configuration of a network system using Mobile IP according to a first embodiment of the present invention.

FIG. 3 is a diagram illustrating a configuration of a network system using Mobile IP according to a first embodiment of the present invention. With reference to FIG. 3, a description will now be made of a packet filtering operation in a packet filtering apparatus according to the first embodiment of the present invention.

A correspondent node 310 is protected by a network 300 employing a packet filter rule of a packet filtering apparatus 320. The correspondent node 310 and a mobile node 370 can perform communication via an HA 360, but they need to optimize the route by directly communicating with each other because of a decrease in the communication efficiency. When the route is optimized by allowing direct communication between the correspondent node 310 and the mobile node 370 using the current standard, there is a need to perform a procedure in which the correspondent node 310 authenticates the mobile node 370 and registers the mobile node 370 therein. If the route optimization process is performed, the correspondent node 310 can transmit data to the mobile node 370 over the optimized route. In this case, the uplink data from the correspondent node 310 to the mobile node 370 may be discarded before it arrives at the mobile node 370 by the packet filter rule for protecting the correspondent node 310. That is, because a destination address of the uplink data is a CoA, the uplink data may be filtered by the packet filter rule.

Therefore, the present invention applies a home address included in a routing header #2 (or routing header type #2) 350 to the packet filter rule in the IP communication network, thereby allowing the uplink data transmitted from the correspondent node 310 to the mobile node 370 to be transmitted without being dropped. In this case, there is a need to allow the packet filter rule to recognize such a rule, and there is also a need for a procedure for determining whether the mobile node 370 was registered after authentication. The recognition can also be achieved using a binding acknowledgement message, a response to a binding update process.

Referring to FIG. 3, the correspondent node 310 transmits a packet including a source address 330, a destination address 340 and a routing header type #2 350, to the packet filtering apparatus 320.

The packet filtering apparatus 320 applies a home address entering the routing header type #2 350 to the packet filter rule, allows the packet filter rule to recognize such a rule, and needs a procedure for determining if the mobile node 370 was registered after authentication. In this case, the packet filtering apparatus 320 receives a binding acknowledgement message from the mobile node 370 to determine if a binding update message has been successfully received.

It is assumed herein that when the packet filter rule is stored in the packet filtering apparatus 320 and a packet is transmitted to the exterior in the network to which the packet filter rule is applied, the packet filtering apparatus 320 analyzes packet header regions of the IP, User Datagram Protocol (UDP) and Transmission Control Protocol (TCP), and applies the analysis result to the packet filter rule.

Figure 4:
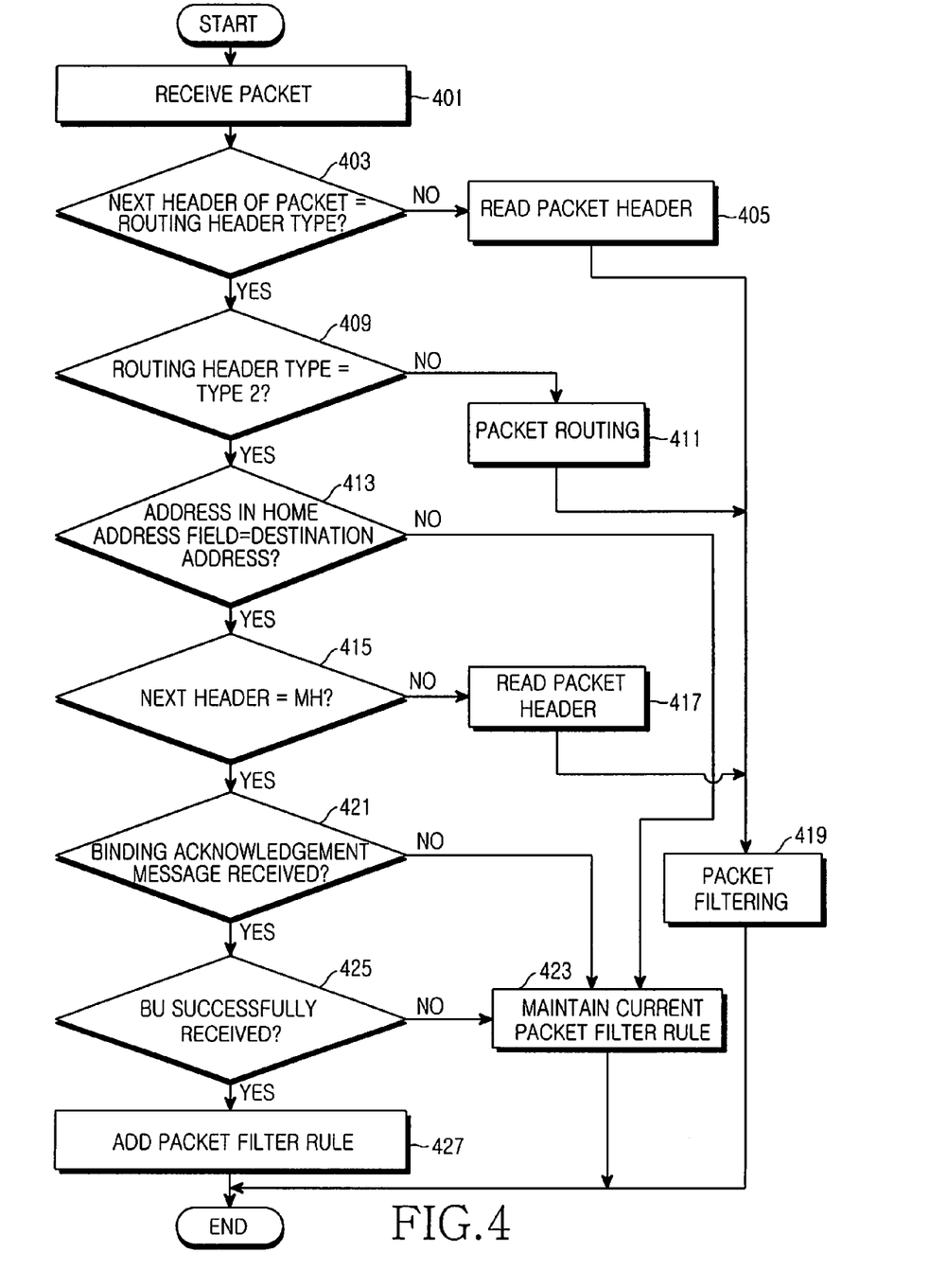
FIG. 4 is a flowchart illustrating a process of recognizing a Binding Acknowledgement (BA) message, a response to a Binding Update (BU) process, and adding a packet filter rule to a packet filtering apparatus according to the first embodiment of the present invention.
Figure 5:
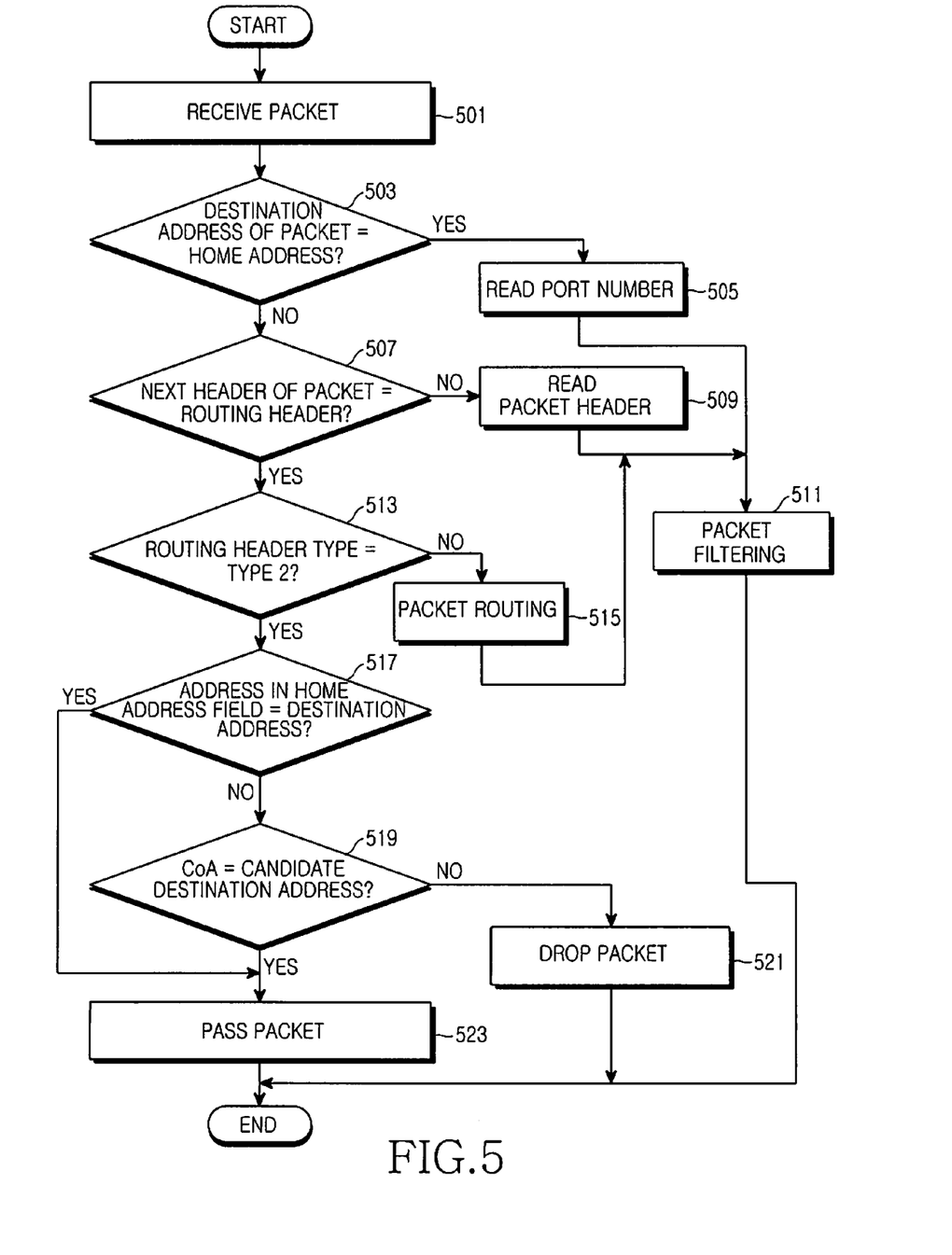
FIG. 5 is a flowchart illustrating a packet filtering method for uplink data transmitted from a correspondent node to a mobile node using a packet filter rule according to the first embodiment of the present invention.

FIGS. 4 and 5 are flowcharts illustrating a packet filtering method in a network system using Mobile IP according to the first embodiment of the present invention. With reference to FIGS. 4 and 5, a description will now be made of a packet filtering operation.

Specifically, FIG. 4 is a flowchart illustrating a process of recognizing a binding acknowledgement message, a response to a binding update process, and adding a packet filter rule to a packet filtering apparatus according to the first embodiment of the present invention.

In step 401, a packet filtering apparatus 320 receives a packet from a correspondent node 310. Thereafter, in step 403, the packet filtering apparatus 320 reads a Next header of the received packet to determine if the Next header is a routing header type.

If the Next header is not a routing header type, the packet filtering apparatus 320 reads a packet header in step 405, and then proceeds to step 419 where it performs a packet filtering process.

However, if the Next header of the packet is a routing header type, the packet filtering apparatus 320 determines in step 409 if the routing header type is a routing header type #2.

If the routing header type is not a routing header type #2, the packet filtering apparatus 320 routes the packet in step 411. Thereafter, the packet filtering apparatus 320 proceeds to step 419 where it performs a packet filtering process.

However, if the routing header type is a routing header type #2, the packet filtering apparatus 320 determines in step 413 if an address in a home address field of the routing header is a destination address of the packet filter rule.

If the address in the home address field of the routing header is not a destination address of the packet filter rule, the packet filtering apparatus 320 proceeds to step 423 where it maintains the current packet filter rule.

However, if the home address of a mobile node is a destination address of the packet filter rule, the packet filtering apparatus 320 determines in step 415 if the Next header of the packet is a Mobility Header (MH). If the Next header of the packet is not an MH, the packet filtering apparatus 320 reads the packet header in step 417, and then proceeds to step 419 where it performs a packet filtering process.

However, if the Next header of the packet is an MH, the packet filtering apparatus 320 determines in step 421 if the received packet is a binding response (or binding acknowledgement) message, a response to a binding update process.

If the received packet is not a binding response message, the packet filtering apparatus 320 maintains the current packet filter rule in step 423.

However, if the received packet is a binding response message, the packet filtering apparatus 320 checks a status field of the binding response message in step 425. As a result of the check, if the status field value is '0', the packet filtering apparatus 320 determines that the correspondent node 310 has successfully received the binding update message.

If it is determined from the binding response message that the correspondent node 310 has not successfully received the binding update message, the packet filtering apparatus 320 proceeds to step 423 where it maintains the current packet filter rule.

However, if it is determined from the binding acknowledgement message that the correspondent node 310 has successfully received the binding update message, the packet filtering apparatus 320 newly adds in step 427 a CoA carried on the destination address to the packet filter rule as a candidate destination address of the packet filter rule, because the correspondent node 310 has completed up to the binding response (binding acknowledgement).

FIG. 5 is a flowchart illustrating a packet filtering method for uplink data transmitted from a correspondent node to a mobile node using a packet filter rule according to the first embodiment of the present invention.

In step 501, a packet filtering apparatus 320 receives a packet from a correspondent node 310.

Thereafter, in step 503, the packet filtering apparatus 320 determines if a destination address of the packet is a home address. If the destination address of the packet is a home address, the packet filtering apparatus 320 reads a port number in step 505, and then proceeds to step 511 where it performs a packet filtering process.

However, if the destination address of the packet is not a home address, the packet filtering apparatus 320 reads a Next header of the packet in step 507 to determine if the Next header is a routing header.

If the Next header is not a routing header, the packet filtering apparatus 320 reads a packet header in step 509, and then performs a packet filtering process in step 511.

However, if the Next header of the packet is a routing header, the packet filtering apparatus 320 determines in step 513 if the routing header is a type #2.

If the routing header is not a type #2, the packet filtering apparatus 320 routes the packet in step 515.

However, if the routing header is a type #2, the packet filtering apparatus 320 determines in step 517 if an address included in a home address field of the routing header is a destination address of the packet filter rule.

If the address included in the home address field of the routing header is a destination address of the packet filter rule, the packet filtering apparatus 320 proceeds to step 523 where it passes the packet.

However, if the address included in the home address field of the routing header is not a destination address of the packet filter rule, the packet filtering apparatus 320 proceeds to step 519 where it determines if a CoA carried on the destination address of the packet is identical to a candidate destination address of the packet filter rule.

If the CoA carried on the destination address of the packet is not identical to a candidate destination address of the packet filter rule, the packet filtering apparatus 320 drops the packet in step 521.

However, if the CoA carried on the destination address of the packet is identical to a candidate destination address of the packet filter rule, the packet filtering apparatus 320 passes the packet in step 523.

Figure 6:
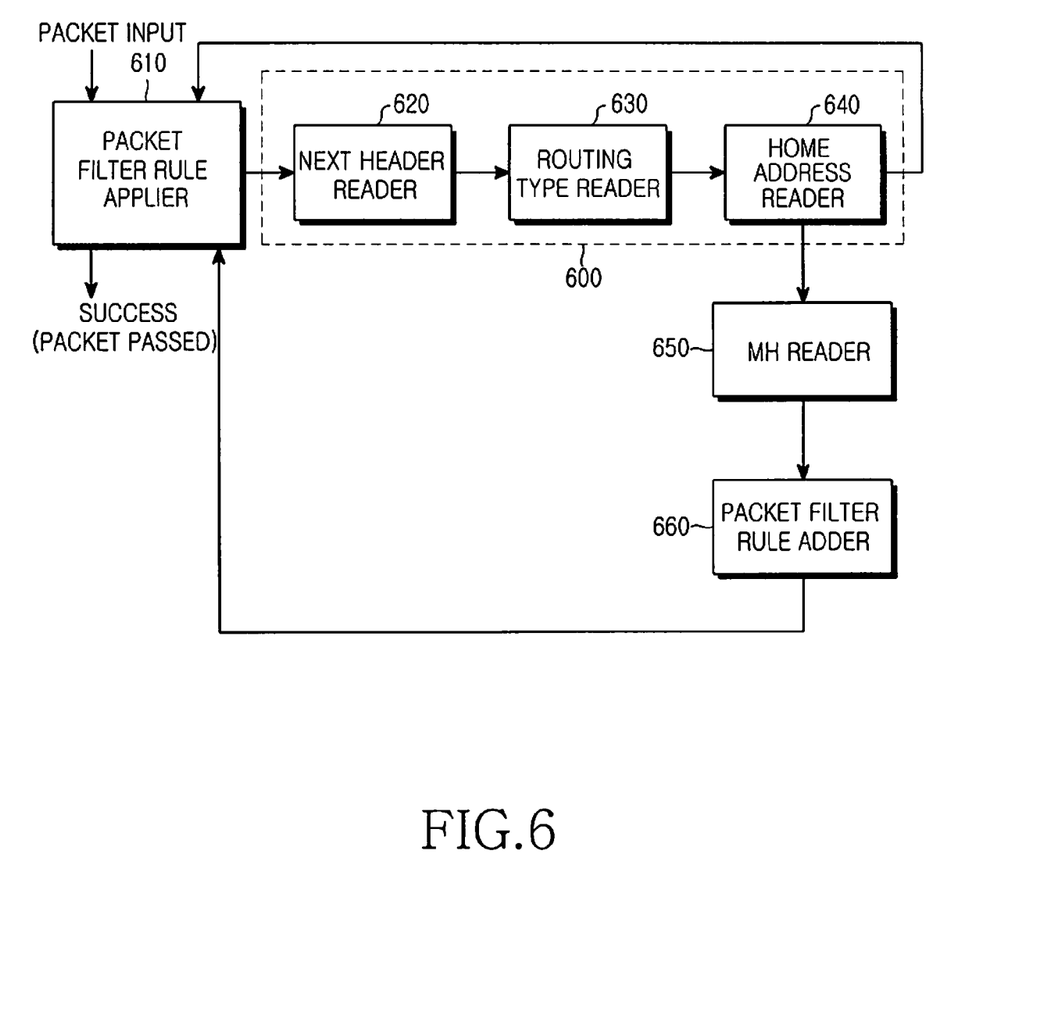
FIG. 6 is a block diagram illustrating a structure of a packet filtering apparatus in a network system using Mobile IP according to the first embodiment of the present invention.

FIG. 6 is a block diagram illustrating a structure of a packet filtering apparatus in a network system using Mobile IP according to the first embodiment of the present invention. With reference to FIG. 6, a description will now be made of a packet filtering operation in a packet filtering apparatus according to the first embodiment of the present invention.

Referring to FIG. 6, a packet filtering apparatus 320 according to the first embodiment of the present invention includes a packet filter rule applier 610 for receiving a packet transmitted from a correspondent node 310 and determining whether to pass the packet, and a reader 600 for reading the received packet to determine whether it uses a routing header type #2 350 used in the first embodiment of the present invention, and checking a destination address of the received packet.

The packet filtering apparatus 320 further includes an MH reader 650 and a packet filter rule adder 660.

Upon receipt of a packet, the packet filter rule applier 610 outputs the received packet to a Next header reader 620 to apply it to a packet filter rule.

The packet filter rule applier 610 compares a home address in a routing header type #2 350 of the packet with a destination address of the packet filter rule, and passes the packet when the home address is identical to the destination address.

The packet filter rule applier 610 compares a CoA carried on the destination address of the packet with a candidate destination address of the packet filter rule, and passes the packet when the CoA is identical to the candidate destination address.

The reader 600 includes the Next header reader 620, a routing type reader 630, and a home address reader 640.

The Next header reader 620 reads a Next header of the received packet to determine if the Next header is a routing header, and then outputs the result to the routing type reader 630.

If the Next header is a routing header, the routing type reader 630 reads the routing header to determine if the routing header is a routing header type #2 350, and then outputs the result to the home address reader 640.

When the routing header uses the routing header type #2 350, the home address reader 640 reads an address in the routing header to determine if the address is a home address of a mobile node, and then outputs the result to the packet filter rule applier 610.

However, if the Next header of the packet is the routing header type #2, the home address reader 640 reads an address in the home address field of the routing header to determine if the address is a destination address of the packet filter rule, and then transfers the packet to the packet filter rule applier 610 if the address is not a destination address. Then the packet filter rule applier 610 maintains the current packet filter rule.

However, if the home address of the mobile node is a destination address, the home address reader 640 transfer the packet to the MH reader 650.

If the home address of the mobile node is not a destination address, the MH reader 650 determines if the Next header of the packet is an MH, and if the Next header of the packet is an MH, the MH reader 650 determines if it has received a binding response message. If a status field value of the binding response message is '0', the MH reader 650 transfers the packet to the packet filter rule adder 660, considering that a correspondent node has successfully received the binding update. That is, depending on the status field value of the binding response message, the MH reader 650 determines whether the correspondent node 310 has successfully received the binding update.

When the correspondent node 310 has successfully received the binding update, the packet filter rule adder 660 newly adds a CoA carried on the destination address to the candidate destination address of the packet filter rule.

Even though the packet filter rule is registered when the mobile node is located in a home network, the second embodiment of the present invention applies to the packet filter rule the characteristic of the packet that the mobile node 370 transmits during data communication with the correspondent node 310 in the MIPv6 network system, thereby preventing the data packet from being dropped even though the correspondent node 310 is located in the home network 300.

A description will now be made of a data transmission/reception method when a packet filter rule is applied according to the present invention in order for the mobile node 370 to transmit data to the correspondent node 310 in the network system using Mobile IP.

Figure 7:
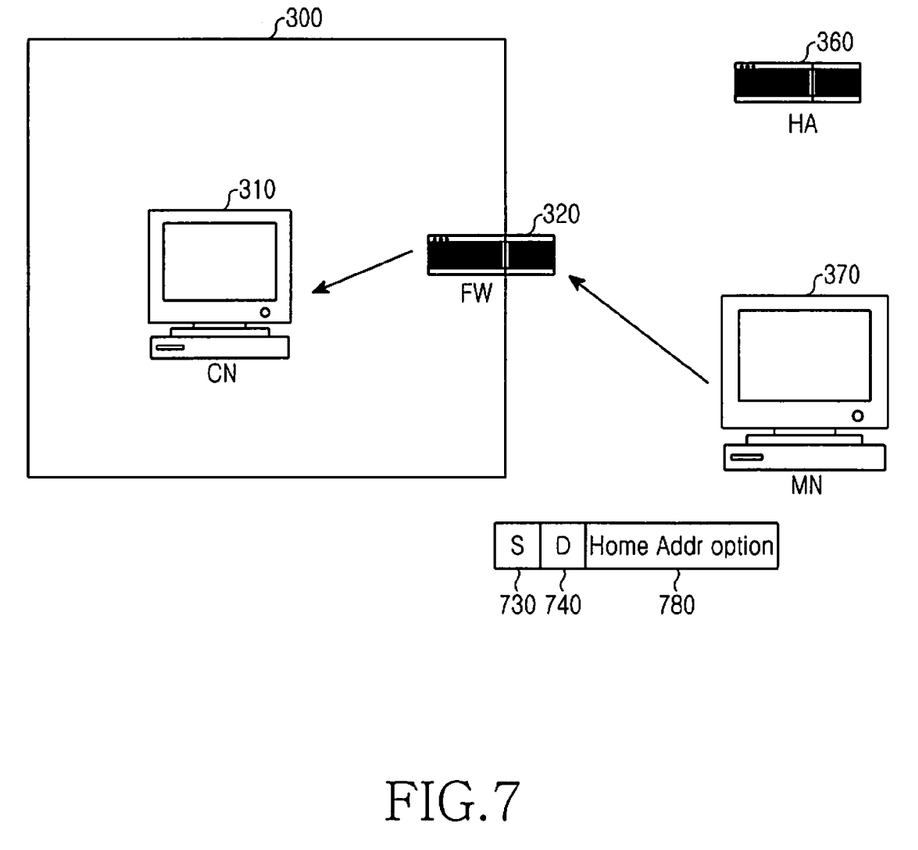
FIG. 7 is a diagram illustrating a configuration of a network system using Mobile IP according to a second embodiment of the present invention.

FIG. 7 is a diagram illustrating a configuration of a network system using Mobile IP according to a second embodiment of the present invention.

Referring to FIG. 7, in a process of sending data from a mobile node 370 to a correspondent node 310, the network system transmits data using a home address option header 780 in which a home address of the mobile node is included. In FIG. 7, the home address option header 780 is also referred to as a home address option 780.

When the mobile node 370 performs data transmission to the correspondent node 310, the correspondent node 310 switches a home address in the home address option header 780 with a source address 730, and uses the home address option header 780 in determining if there is any data transmitted from the mobile node 370 that was communicating with the correspondent node 310. That is, the home address is used when the correspondent node 310 reads corresponding data, recognizing that the mobile node 370 is a mobile node 370 that was communicating with the original correspondent node 310.

In the second embodiment of the present invention, when a packet is directly transmitted from the mobile node 370 to the correspondent node 310 via the packet filtering apparatus 320 to which the packet filter rule is applied, the packet filtering apparatus 320 reads an address in a home address option using the home address option header 780, and directly passes the packet if the address is identical to a source address of the packet filter rule. The packet filtering apparatus 320 herein can be a router, and the home address is stored in the home address option header 780 in the form of a 128-bit MIPv6 address.

A description will now be made of a packet filtering method in a packet filtering apparatus according to the second embodiment of the present invention.

Figure 8:
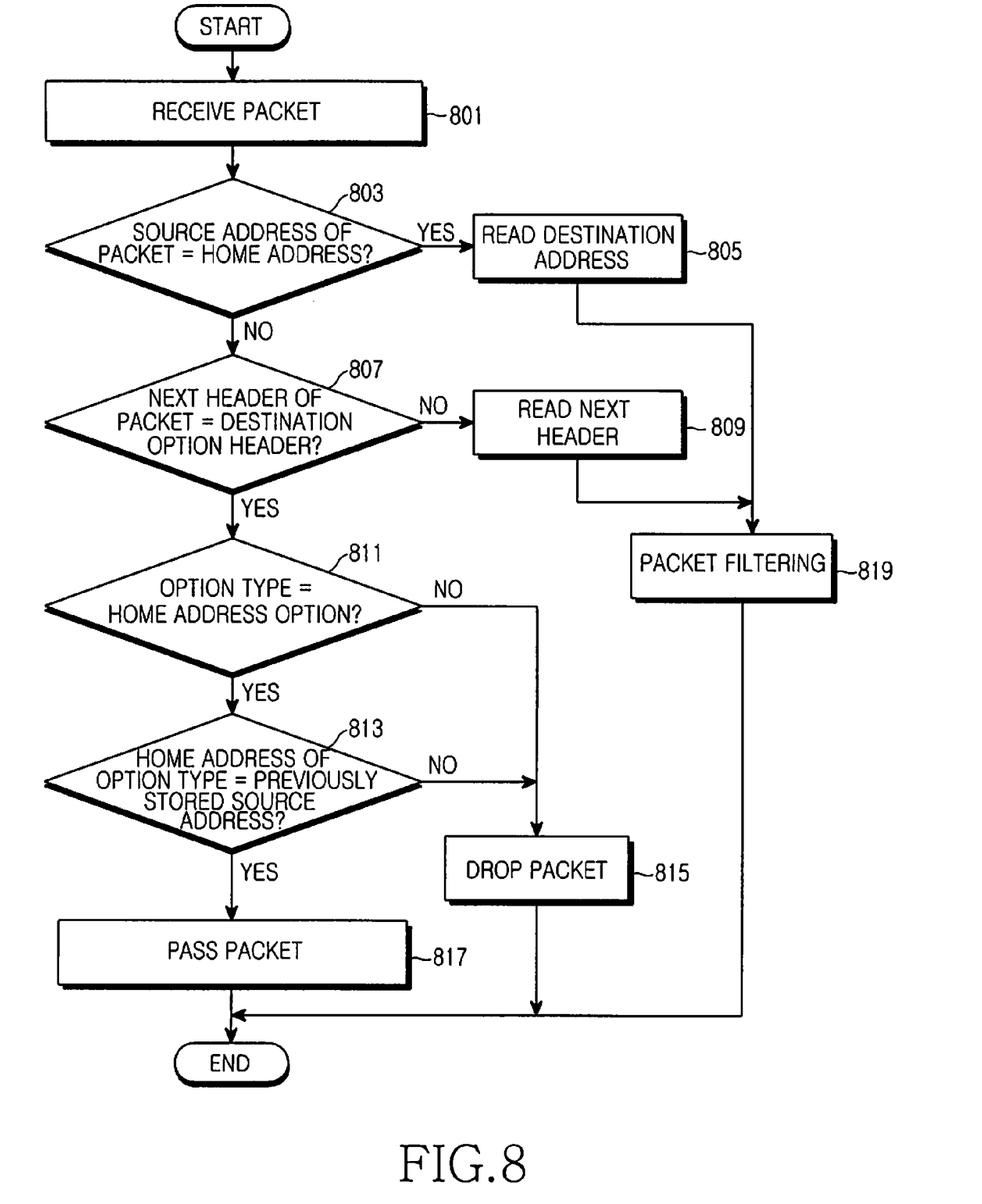
FIG. 8 is a flowchart illustrating a packet filtering method according to the second embodiment of the present invention.

FIG. 8 is a flowchart illustrating a packet filtering method according to the second embodiment of the present invention.

Referring to FIG. 8, a packet filtering apparatus 320 receives a packet from a mobile node 370 in step 801. The packet filtering apparatus 320 determines in step 803 if a source address of the received packet is a home address. If the source address of the received packet is a home address, the packet filtering apparatus 320 reads a destination address of the received packet in step 805, and then performs a packet filtering process in step 819. However, if the source address is not a home address of the mobile node 370, the second embodiment of the present invention performs the following operation to determine if the received packet is an appropriate packet.

The packet filtering apparatus 320 reads a Next header in step 807 to determine if the Next header is a destination option header. If the Next header is not a destination option header, the packet filtering apparatus 320 reads a type of the Next header in step 809, and then performs a packet filtering process in step 819. However, if the Next header is a destination option header, the packet filtering apparatus 320 reads, in step 811, an option type to determine if the option type is a home address option.

If the option type is not a home address option, the packet filtering apparatus 320 proceeds to step 815 where the packet filtering apparatus 320 drops the received packet, considering that a MIPv6 destination option header is used. However, if the option type is a home address option, the packet filtering apparatus 320 reads a home address, because a MIPv6 home address option is used. Then the packet filtering apparatus 320 determines in step 813 if an address of a home address option of the read option type is a source address previously stored in the packet filter rule. If the home address of the option type is a source address by the packet filter rule, the packet filtering apparatus 320 passes the received packet in step 817. Otherwise, the packet filtering apparatus 320 drops the packet in step 815.

A description will now be made of a packet filtering apparatus and method for determining pass/non-pass of data depending on an option value of a home address used in the second embodiment of the present invention.

Figure 9:
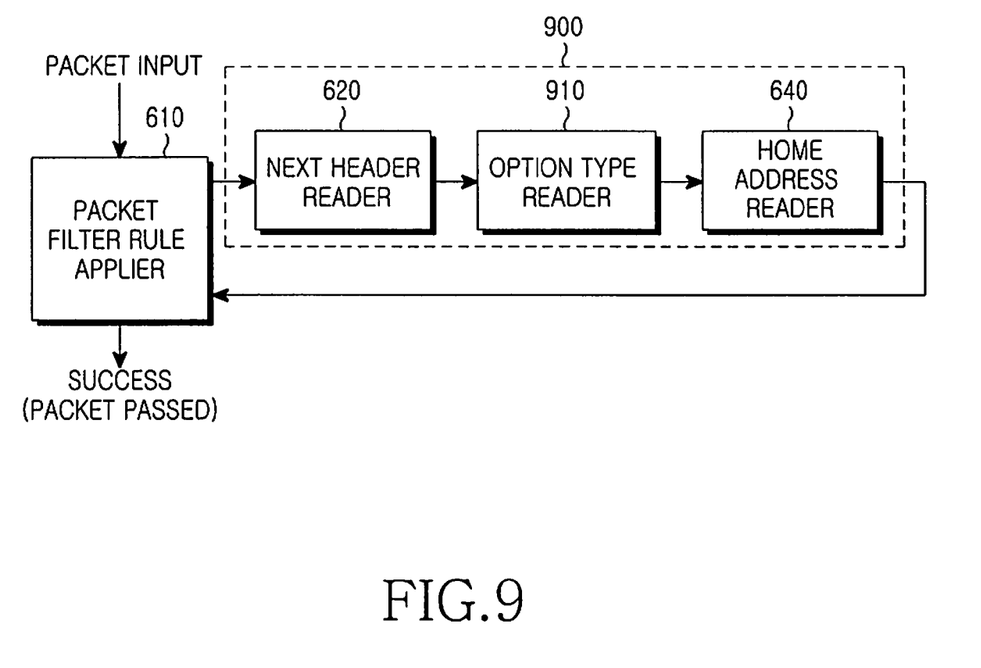
FIG. 9 is a block diagram illustrating a structure of a packet filtering apparatus according to the second embodiment of the present invention.

FIG. 9 is a block diagram illustrating a structure of a packet filtering apparatus according to the second embodiment of the present invention.

Referring to FIG. 9, a packet filtering apparatus 320 according to the present invention includes a packet filter rule applier 610 for receiving a packet transmitted from an exterior of a home network 300 and determining whether to pass the packet, and a reader 900 for reading a received packet to determine if the received packet uses a home address option header 780 used in the second embodiment of the present invention, and checking a source address of the received packet.

The packet filter rule applier 610 determines if a source address of a received packet is a source address based on a predetermined packet filter rule. If the source address of the received packet is not a source address based on the predetermined packet filter rule, the packet filter rule applier 610 receives a source address of the received packet from the reader 90Q, and compares the source address with the source address based on the predetermined packet filter rule to determine whether to pass the received packet. That is, the packet filter rule applier 610 determines if the home address in the home address option header 780 is identical to the source address based on the packet filter rule to determine whether to pass the received packet.

The reader 900 analyzes packet header regions of IP, UDP and TCP, and applies the analysis result to the packet filter rule. The reader 900 includes a Next header reader 620, an option type reader 910, and a home address reader 640.

If a source address in a Next header of the received packet is not an authorized home address, the Next header reader 620 reads the Next header to determine the Next header uses a destination option header. If the Next header uses the destination option header, the option type reader 910 reads an option type to determine the option type uses a home address option. If the option type is a home address option, the home address reader 640 reads a source address of the received packet and transfers the received packet to the packet filter rule applier 610. That is, if the option type is a home address option, the home address reader 640 reads a home address in the home address option header.

As is apparent from the foregoing description, the present invention provides a packet filtering apparatus and method for performing uplink communication from a correspondent node to a mobile node without passing through an HA, if the mobile node is an appropriate mobile node that has completed both an authentication process (return routability) and a registration process (binding update) for the correspondent node in a network system using Mobile IP.

Further, the present invention provides a packet filtering apparatus and method for recognizing a characteristic of an uplink data packet transmitted from a correspondent node to a mobile node in a network system using Mobile IP, so the packet can be transmitted from the correspondent node to the mobile node without being discarded.

In addition, the present invention provides a packet filtering apparatus and method for determining if an authentication process and a registration process from a mobile node to a correspondent node has been completed, adding a new rule to a packet filter rule according to the determination result, and allowing the packet filter rule to recognize a MIPv6 data transmission process in uplink data transmission so that data can be transmitted from the correspondent node to the mobile node without being dropped during its transmission, in a network system using Mobile IP.

Also, if there is a need for communication with a correspondent node in a protected network, the present invention provides a packet filtering apparatus and method of using a home address option, thereby allowing a packet to be transmitted without being dropped when direct communication from a mobile node to the correspondent node is performed without passing through an HA, in a network system using Mobile IP.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A packet filtering method in a packet filtering apparatus of a network system using Mobile Internet Protocol (IP), the method comprising:
    determining if a next header of a packet received from a correspondent node (CN) is a routing header type;
    determining if a home address included in the routing header type is identical to a destination address stored in a packet filter rule, if the next header of the packet is the routing header type;
    determining if the next header of the packet is a mobility header, if the home address included in the routing header type is the destination address stored in the packet filter rule;
    determining if a binding response message is received, if the next header of the packet is the mobility header;
    determining if the CN has successfully received a binding update according to a status field value of the binding response message;
    adding a Care-of Address (CoA) carried on the destination address of the received packet to the packet filter rule as a candidate destination address, if the CN has successfully received the binding update; and
    maintaining a current packet filter rule, if the CN has not successfully received the binding update,
    wherein the packet filter rule is stored in the packet filtering apparatus and is applied to a result of analyzing packet header regions.

2. The method of claim 1, further comprising:
    determining if the CoA carried on the destination address of the packet is identical to the candidate destination address of the packet filter rule, if the address included in the routing header type is not identical to the destination address stored in the packet filter rule; and
    passing the packet, if the CoA is identical to the candidate destination address.

3. A packet filtering apparatus in a network system using Mobile Internet Protocol (IP), the apparatus comprising:

a next header reader for reading a next header to determine if the next header of a packet received from a Correspondent Node (CN) is a routing header type;

a home address reader for reading a routing header type to determine if a home address included in the routing header type is identical to a destination address stored in a packet filter rule, if the next header of the packet is the routing header type;

a mobility header reader for determining if a next header of the packet is a mobility header, if the home address included in the routing header type is the destination address stored in the packet filter rule, determining if a binding response message is received if the next header of the packet is the mobility header, and determining if the CN has successfully received a binding update according to a status field value of the binding response message; and a packet filter rule adder for adding a Care-of Address (CoA) carried on the destination address of the received packet to the packet filter rule as a candidate destination address, if the CN has successfully received the binding update, wherein the packet filter rule adder maintains a current packet filter rule, if the CN has not successfully received the binding update, and wherein the packet filter rule is stored in the packet filtering apparatus and is applied to a result of analyzing packet header regions.

4. The packet filtering apparatus of claim 3, further comprising:

a packet filter rule applier for determining if the CoA carried on the destination address of the packet is identical to the candidate destination address of the packet filter rule, if the address included in the routing header type is not identical to the destination address stored in the packet filter rule, and for passing the packet, if the CoA is identical to the candidate destination address.

* * * * *